(12) United States Patent
Jansson et al.

(10) Patent No.: US 9,670,789 B2
(45) Date of Patent: Jun. 6, 2017

(54) COMPOSITE GUIDE VANE

(75) Inventors: Niklas Jansson, Mölndal (SE); Robert Reimers, Uddevalla (SE)

(73) Assignee: GKN Aerospace Sweden AB, Trollhattan (SE)

( * ) Notice: Subject to any disclaimer, the term of this patent is extended or adjusted under 35 U.S.C. 154(b) by 932 days.

(21) Appl. No.: 14/005,144

(22) PCT Filed: Mar. 14, 2011

(86) PCT No.: PCT/SE2011/000050
§ 371 (c)(1),
(2), (4) Date: Nov. 15, 2013

(87) PCT Pub. No.: WO2012/125085
PCT Pub. Date: Sep. 20, 2012

(65) Prior Publication Data
US 2014/0294579 A1    Oct. 2, 2014

(51) Int. Cl.
F01D 9/04 (2006.01)
F01D 9/02 (2006.01)
F01D 25/24 (2006.01)
F01D 25/28 (2006.01)

(52) U.S. Cl.
CPC ............... F01D 9/02 (2013.01); F01D 9/04 (2013.01); F01D 25/246 (2013.01); F01D 25/28 (2013.01); F05B 2260/301 (2013.01); Y02T 50/672 (2013.01)

(58) Field of Classification Search
CPC ... F01D 9/02; F01D 9/04; F01D 9/041; F01D 25/28; F01D 25/246; F01D 5/141
See application file for complete search history.

(56) References Cited

U.S. PATENT DOCUMENTS 5,320,490 A      6/1994  Corbin et al.
2010/0180439 A1*  7/2010  Garcia Castro ....... B29C 70/086
                                                        29/889.71

FOREIGN PATENT DOCUMENTS

EP           1657401 A2    5/2006
SE    WO 2008121047 A1 * 10/2008 ........... F01D 5/3023

OTHER PUBLICATIONS

International Search Report (Nov. 17, 2011) for corresponding International Application PCT/SE2011/000050.

* cited by examiner

Primary Examiner — Gregory Anderson
Assistant Examiner — Maxime Adjagbe
(74) Attorney, Agent, or Firm — Bejin Bieneman PLC

(57) ABSTRACT

A composite guide vane for a gas turbine structure is adapted to extend in a guide vane direction from a first housing towards a second housing of the gas turbine structure. The guide vane includes a guide vane length in the guide vane direction and the guide vane includes a first attachment portion with at least one first opening for attachment of the guide vane to the first housing. The first opening extends in a first opening direction which forms an angle with the guide vane direction. The guide vane includes a cover portion including a first material and a core portion which is at least partially enclosed by the cover portion.

14 Claims, 6 Drawing Sheets

COMPOSITE GUIDE VANE

BACKGROUND AND SUMMARY

The present disclosure relates to a composite guide vane. Further, the present disclosure relates to a gas turbine structure. Moreover, the present disclosure relates to a gas turbine engine. Furthermore, the present disclosure relates to an aeroplane.

A gas turbine engine may be used as a jet engine. The term jet engine includes various types of engines, which admit air at relatively low velocity, heat it by combustion and shoot it out at a much higher velocity.

Accommodated within the term jet engine are, for example, turbojet engines and turbo-fan engines. The invention will below be described for a turbo-fan engine, but may of course also be used for other engine types.

A gas turbine structure, which may sometimes be denoted a case or frame, is used for supporting and carrying bearings, which in turn, rotatably support rotors. Conventional turbo fan engines have a fan frame, a mid-frame and an aft turbine frame. These frames constitute a gas turbine structure including a first housing, a second housing and a strut or a vane having a first end of the strut or vane being attached to the first housing and a second end being attached to the second housing. A vane or strut may be made of a composite material.

In order to achieve the attachment of the strut or vane to the first housing and the second housing, respectively, U.S. Pat. No. 5,320,490 proposes the use of linking braces each one of which connecting a corner of a composite vane to the first or second housing. However, the '490 solution implies that the corners of the composite vane may be subjected to large stresses.

It is desirable to provide a composite guide vane which overcomes or ameliorates at least one of the disadvantages of the prior art, or to provide a useful alternative.

As such, the present disclosure relates to a composite guide vane for a gas turbine structure. The guide vane is adapted to extend in a guide vane direction from a first housing towards a second housing of the gas turbine structure. Moreover, the guide vane has a guide vane length in the guide vane direction and the guide vane comprises a first attachment portion with at least one first opening for attachment of the guide vane to the first housing of the gas turbine structure. The first opening extends in a first opening direction which forms an angle with the guide vane direction.

The guide vane further comprises a first guide vane centre point which is a point halfway between the leading edge and the trailing edge along the mean camber line which point is adapted to be located closest to the first housing. Moreover, the guide vane further comprises a second guide vane centre point which is a point halfway between the leading edge and the trailing edge along the mean camber line which point is adapted to be located closest to the second housing.

As used herein, the expression "guide vane direction" relates to the direction from the first guide vane centre point to the second guide vane centre point. In a similar vein, as used herein, the expression "guide vane length" relates to the distance between the first guide vane centre point and the second guide vane centre point.

Generally, an opening has an opening axial extension and an opening circumferential extension. As used herein, the expression "first opening direction" relates to a direction parallel the opening axial extension.

Furthermore, the guide vane comprises a cover portion comprising a first material and a core portion which is at least partially enclosed by the cover portion. The core portion comprises a second material which is different from the first material. Further, the guide vane comprises a leading edge and a trailing edge and the guide vane extends from the leading edge to the trailing edge along a mean camber line.

As used herein, the expression "mean camber line" relates to the locus of points halfway between a suction side and a pressure side of the guide vane as measured perpendicular to the mean camber line itself. The extension of the mean camber line in relation to the guide vane direction will be described with reference to FIG. 5 hereinbelow.

Moreover, the guide vane comprises a chord length being the distance from the leading edge to the trailing edge along the mean camber line. The guide vane comprises a first chord length at a first position in the guide vane direction and a second chord length at a second position in the guide vane direction. Further, second position is located at a first distance from the first opening in the guide vane direction and the first position is located at the first opening or between the first opening and the second position in the guide vane direction. The first distance is less than or equal to 0.15 of the guide vane length.

According to the present disclosure, the ratio between the first chord length and the second chord length greater than or equal to 1.10, preferably greater than or equal to 1.15.

A guide vane generally has a vane thickness, i.e. an extension in a direction perpendicular to the mean camber line, which: is relatively small at the leading edge, increases in a first portion of the vane along the mean camber line and then decreases in a second portion of the vane so as to be relatively small at the trailing edge. It is often desired that the opening or openings for the attachment of the vane to the first housing are located at a distance from the leading edge and trailing edge, respectively, such that the opening or openings are provided in a portion of the first attachment portion which have an appropriate vane thickness.

However, it is generally not desired to put the opening or openings too far from the leading edge and trailing edge, respectively, since this may result in an attachment of the guide vane to the first housing which does not provide a sufficient stiffness. This is since the openings or openings may in such cases be located too close to a guide vane centre line, i.e. a line extending halfway between the leading edge and the trailing edge.

The guide vane according to the present invention is wider at the first position, i.e. at a location closer to the attachment opening or openings, than the second position. This implies that the first attachment portion of the guide vane of the present disclosure, or at least a portion thereof, may be wider as compared prior art guide vanes.

The wider first attachment portion implies that the opening or openings may be located in a portion of the guide vane which has an appropriate thickness. Moreover, the opening or openings may nevertheless be located at an appropriate distance from the guide vane centre line such that a desired stiffness may be obtained.

As such, by the widening of the first attachment portion as described hereinabove, an appropriate local strength of the opening or openings for attachment members, such as bolts, rivets or the like, is obtained at the same time as an appropriate stiffness of the attachment of the guide vane to the first housing is obtained.

Moreover, since the widening of the first attachment portion occurs over 15% or less of the guide vane length, the widening will not, at least not to any greater extent, have a negative influence on the aerodynamic properties and/or the weight of the guide vane.

According to the present disclosure, the guide vane may comprise a first leading edge point on the mean camber line of the first position and a second leading edge point on the mean camber line of the second position. Moreover, the guide vane may comprise a first intermediate point located at a position on the mean camber line of the first position such that a first line between the first intermediate point and the second leading edge point will extend in a direction which is parallel to the guide vane direction. Furthermore, the guide vane may have a leading edge distance which is the distance from the first intermediate point to the first leading edge point along the mean camber line. The leading edge distance may be at least 10%, preferably at least 15%, of the second chord length.

A portion of the guide vane which is located close to the leading edge may in many implementations be imparted structural loads which are larger than loads imparted on the trailing edge portion of the guide vane. Consequently, it may be preferred to implement the widening of the guide vane such that at least a portion of the additional chord length is located at the leading edge of the guide vane.

According to the present disclosure, the guide vane may comprise a first trailing edge point on the mean camber line of the first position and a second trailing edge point on the mean camber line of the second position. Moreover, the guide vane may comprise a second intermediate point located at a position on the mean camber line of the first position such that a second line between the second intermediate point and the second trailing edge point will extend in a direction which is parallel to the guide vane direction. Furthermore, the guide vane may have a trailing edge distance being the distance from the second intermediate point to the first trailing edge point along the mean camber line. The trailing edge distance may be at least 10%, preferably at least 15%, of the second chord length.

According to the present disclosure, the core portion may have an extension which terminates before the first opening. As such, the first opening may be delimited by the cover portion but not the core portion. In implementations of the composite guide vane, the first material, which forms at least a part of the cover portion, generally has structural characteristics which are better than the structural characteristics of the second material, which forms at least a part of the core portion. Purely by way of example, the first material may have a yield stress and/or modulus of elasticity which is higher than the yield stress and/or modulus of elasticity of the second material.

As such, implementations of the guide vane wherein the first opening is delimited by the cover portion may result in an increased strength of the attachment of the guide vane to the first housing. Optionally, or in addition, implementations of the guide vane wherein the first opening is delimited by the cover portion may result in that the thickness of the guide vane at the location of the first opening may be reduced as compared to prior art composite guide vanes.

According to the present disclosure, the first opening may be located a first opening distance from the leading edge along the mean camber line. Moreover, the first opening distance may be at least 5%, preferably at least 10%, of the first chord length.

According to the present disclosure, the first attachment portion may comprise a plurality of openings. Moreover, each one of the openings may be located at a distance from the leading edge along the mean camber line of at least 5%, preferably at least 10%, of the first chord length.

According to the present disclosure, the first attachment portion may comprise a plurality of openings. Moreover, each one of the openings may be located at a distance from the trailing edge along the mean camber line of at least 5%, preferably at least 10%, of the first chord length.

According to the present disclosure, the guide vane may further comprise a second attachment portion comprising at least one second opening for attachment of the guide vane to the second housing of the gas turbine structure. The guide vane may comprise a third chord length at a third position in the guide vane direction and a fourth chord length at a fourth position in the guide vane direction. Furthermore, the fourth position may be located at a second distance from the second opening in a direction opposite to the guide vane direction and the third position may be located at the second opening or between the second opening and the fourth position in a direction opposite to the guide vane direction. The second distance may be less than or equal to 0.15 of the guide vane length. Furthermore, the ratio between the third chord length and the fourth chord length may be greater than or equal to 1.10, preferably greater than or equal to 1.15.

According to the present disclosure, the first material may be a composite material such as a carbon fibre reinforced polymer.

According to the present disclosure, the second material may be a structural core material such as a foam or a honeycomb core material.

A second aspect of the present disclosure relates to a gas turbine structure comprising a first housing, a second housing and a guide vane according to the first aspect of the present disclosure.

According to the second aspect of the present disclosure, the gas turbine structure may further comprise a flow passage between the first housing and the second housing. Moreover, the gas turbine structure may further comprise a flow passage delimiting member which is positioned such that the first attachment portion is separated from the flow passage.

The guide vane may comprise a leading edge flow passage point being the point on the leading edge which is located closest to the flow passage delimiting member in the guide vane direction. Moreover, the guide vane may further comprise a trailing edge flow passage point being the point on the trailing edge which is located closest to the flow passage delimiting member in the guide vane direction.

A third aspect of the present disclosure relates to a gas turbine engine comprising a gas turbine structure according to the second aspect of the present disclosure.

A fourth aspect of the present disclosure relates to an aeroplane comprising a gas turbine engine according to the third aspect of the present disclosure.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
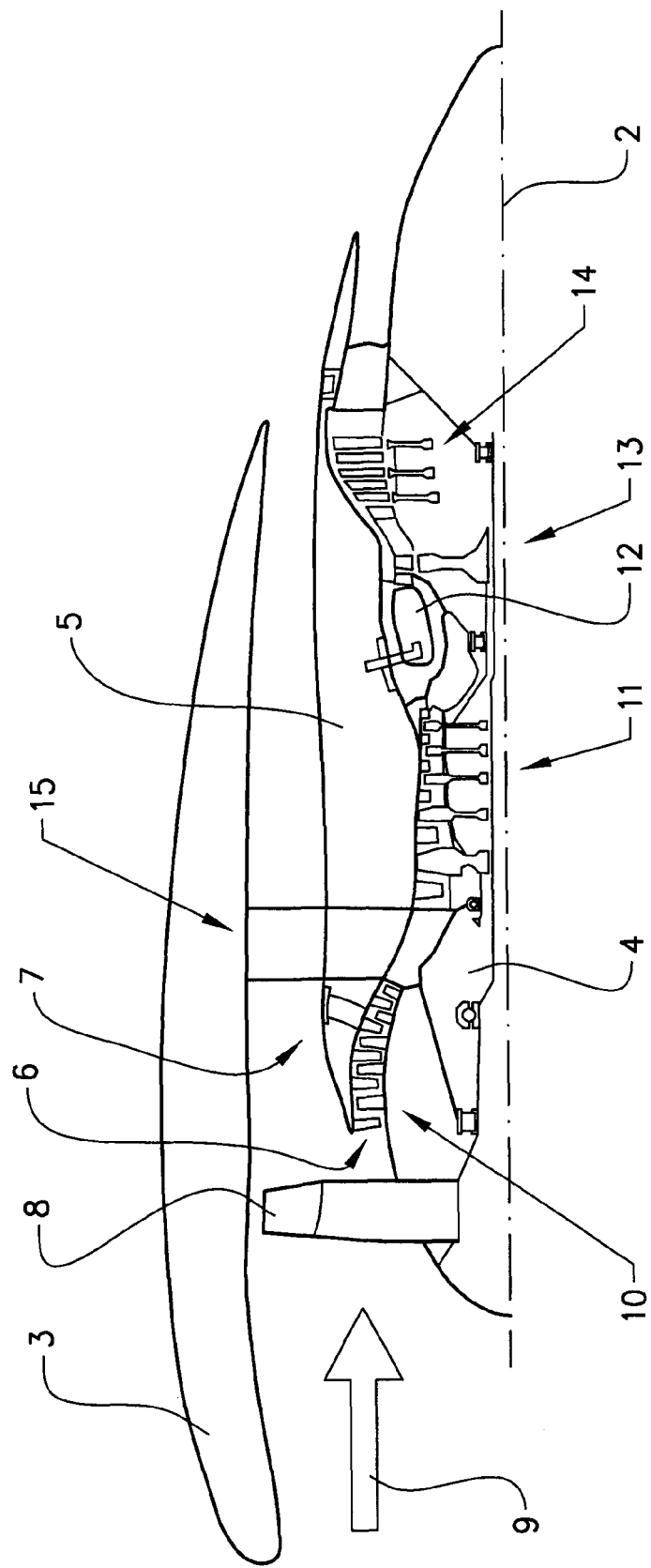
FIG. 1 illustrates a gas turbine engine.

The invention will below be described for a turbofan gas turbine aircraft engine 1, which in FIG. 1 is circumscribed about an engine longitudinal central axis 2. The engine 1 comprises an outer casing or nacelle 3, an inner casing 4 (rotor) and an intermediate casing 5 which is concentric to the first two casings and divides the gap between them into an inner primary gas channel 6 for the compression of air and a secondary channel 7 in which the engine bypass air flows. Thus, each of the gas channels 6, 7 is annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas channel 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

A first or high pressure shaft joins the high pressure turbine 13 to the high pressure compressor 11 to substantially form a first or high pressure rotor. A second or low pressure shaft joins the low pressure turbine 14 to the low pressure compressor 10 to substantially form a second or low pressure rotor. The high pressure compressor 11, combustor 12 and high pressure turbine 13 are collectively referred to as a core engine. The second or low pressure shaft is at least in part rotatably disposed co-axially with and radially inwardly of the first or high pressure rotor.

The engine 1 comprises an intermediate case (IMC) 15. The intermediate case 15 is located between the Low Pressure Compressor 10 and the High Pressure Compressor 11 in the engine axial direction. The intermediate case 15 comprises a core structure, which comprises the primary gas duct 6, and a by-pass structure, which comprises the fan duct 7. The engine 1 is mounted to an aircraft via the IMC such as by a pylon (not illustrated), which extends downwardly from an aircraft wing.

The by-pass structure comprises an inner housing, an outer housing and a plurality of circumferentially spaced vanes arranged between the inner ring and the outer ring, wherein gas flow channels are formed between the adjacent vanes.

Figure 2:
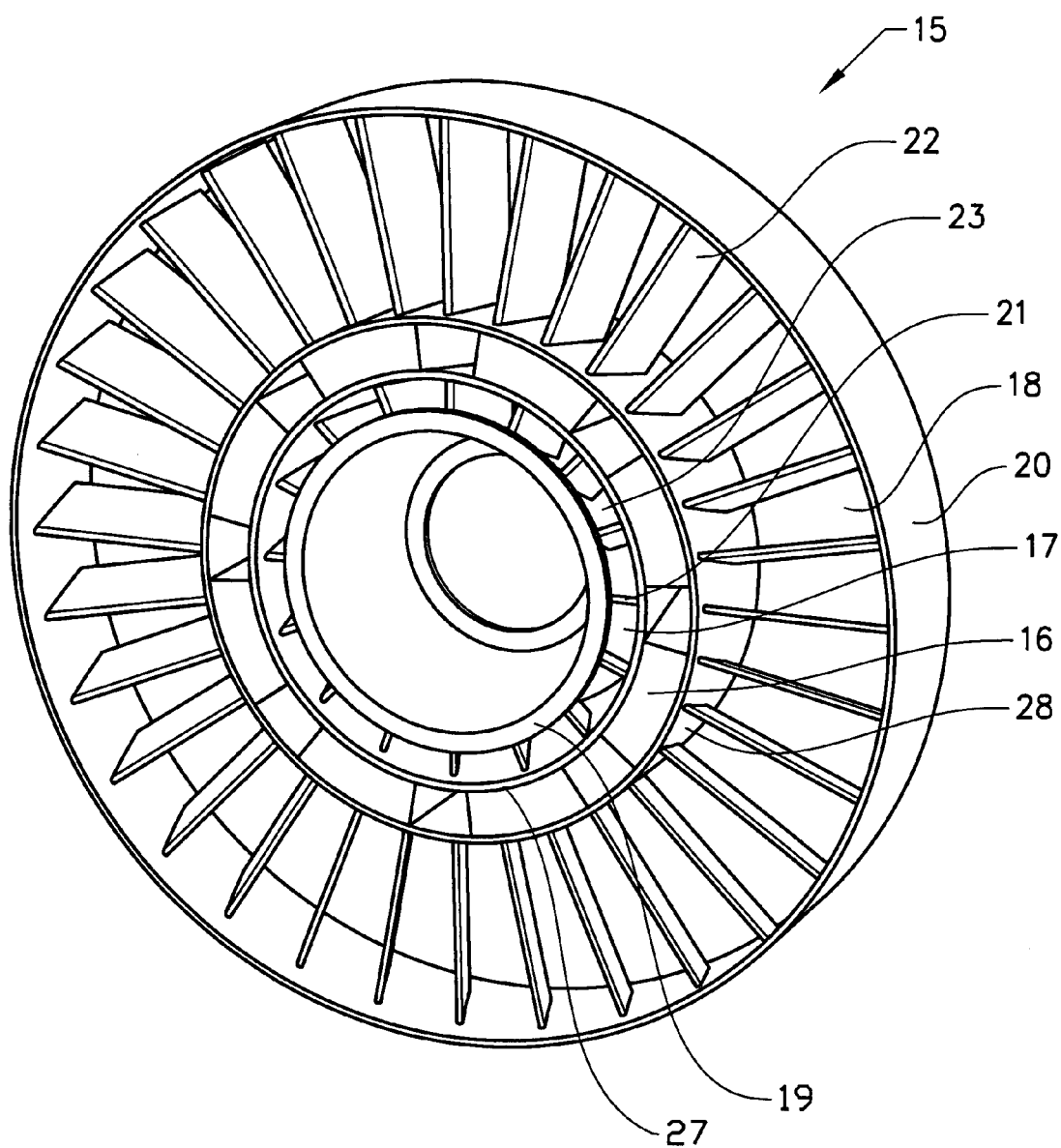
FIG. 2 illustrates a gas turbine structure of the FIG. 1 gas turbine engine.

FIG. 2 illustrates a perspective view of the gas turbine structure 15 which in the FIG. 2 implementation is a static component. The gas turbine structure 15 comprises an annular intermediate member, or splitter, 16, which defines inner and outer annular passages 17, 18. The inner passage 17 forms part of the inner primary gas channel 6 of the aircraft engine and the outer passage 18 forms part of the secondary channel 7 in which the engine bypass air flows.

The annular intermediate member 16 is supported between an inner annular support member 19 and an outer annular support member 20 by a plurality of circumferentially spaced radial inner and outer guide vanes 21, 22. The inner and outer support members 19, 20 and the annular intermediate member 16 may preferably be coannular. Opposite ends of the inner guide vanes 21 are rigidly connected to the inner annular member 19 and the intermediate member 16 for transmitting structural loads between the members. Opposite ends of the outer guide vanes 22 are rigidly connected to the intermediate member 16 and the outer annular member 20 for transmitting structural loads between the members.

The air is forced rearwardly through openings between adjacent guide vanes 21, 22. The annular intermediate member 16 comprises an inner ring 27 and an outer ring 28 which may be of metal material. The outer ring 28 together with the outer annular member 20 defines the outer passage 18. The inner ring 27 together with the inner support member 19 defines the inner passage 17. Embodiments of the guide vane 22 will be described hereinbelow.

Figure 3:
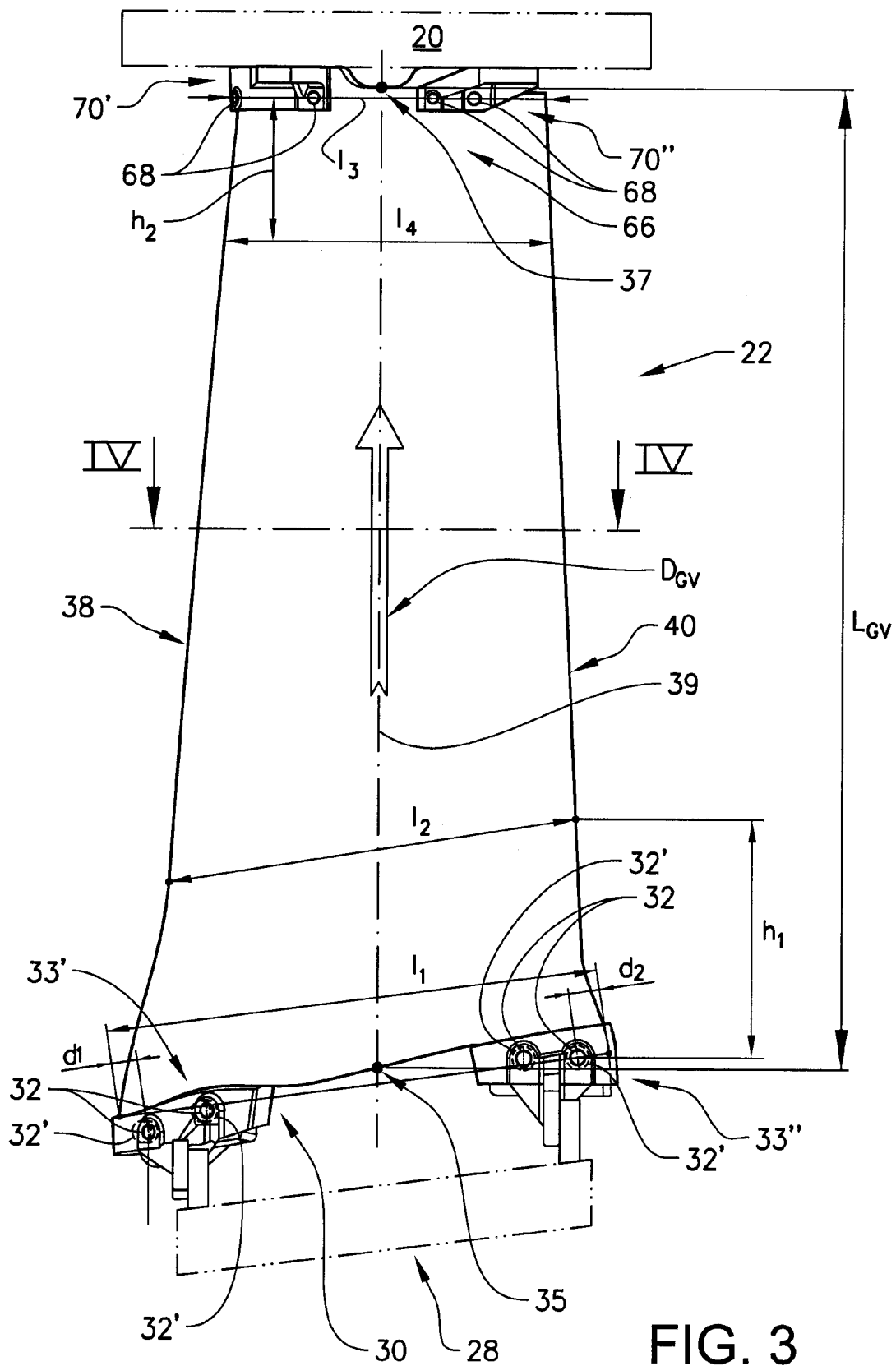
FIG. 3 illustrates a side view of a guide vane according to an embodiment according to the present invention.

FIG. 3 illustrates an embodiment of a guide vane 22 according to the present invention. As may be gleaned from FIG. 3, the guide vane 22 is adapted to be attached to a first housing 28, which in the FIG. 3 embodiment is the outer ring, and a second housing 20, which in the FIG. 3 embodiment is the outer annular support member. Moreover, FIG. 3 illustrates that the guide vane 22 extends from the first housing 28 to the second housing 20 in a guide vane direction DGv.

However, in other embodiments of the guide vane 22 according to the present invention, the first housing 28 and the second housing may be located in other positions in the gas turbine engine 1. Purely by way of example, the first housing may be the inner annular member 19 and the second housing may be the annular intermediate member 16.

The gas turbine structure 15 of the present invention is preferably located in the cold portions of a gas turbine engine, i.e. in a portion of the engine which is located upstream of the combustor 12 and/or which is located in the fan duct 7.

FIG. 3 also illustrates that the guide vane 22 has a guide vane length LGV in the guide vane direction DGv and the guide vane 22 comprises a first attachment portion 30 with at least one first opening 32 for attachment of the guide vane 22 to the first housing 28. In the embodiment of the guide vane 22 illustrated in FIG. 3, the first attachment portion 30 comprises four openings 32.

Moreover, FIG. 3 illustrates that the guide vane 22 comprises a first guide vane centre point 35 which is a point halfway between the leading edge 38 and the trailing edge 40 along the mean camber line which point 35 is adapted to be located closest to the first housing 28. Moreover, the guide vane further comprises a second guide vane centre point 37 which is a point halfway between the leading edge 38 and the trailing edge 40 along the mean camber line which point is adapted to be located closest to the second housing 20. The guide vane direction DGv relates to the direction from the first guide vane centre point 35 to the second guide vane centre point 37. In a similar vein, the guide vane length LGv relates to the distance between the first guide vane centre point 35 and the second guide vane centre point 37. Moreover, the guide vane 22 comprises a centre line 39 extending through the first guide vane centre point 35 as well as the second guide vane centre point 37.

In the implementation of the guide vane 22 and the first housing 28 illustrated in FIG. 3, the guide vane 22 is attached to the first housing 28 by means of two first attachment structures 33', 33". The attachment structures may also be referred to as brackets. Each one of the first attachment structures 33', 33" is a separate member which may be releasably attached to the guide vane 22 and the first housing 28, preferably by means of bolt joints 32'. However, in other implementations of the guide vane 22 and the first housing 28, the guide vane 22 may be attached to a first housing 28 via an attachment structure which is fixedly attached to the first housing 28 (not shown in FIG. 3) or which form an integral component with the first housing 28 (not shown in FIG. 3).

Each one of the FIG. 3 attachment structures 33', 33" is preferably made of a metal or a metal alloy. Purely by way of example, the metal or metal alloy may comprise at least one of the following metals: aluminium, titanium or steel.

Figure 4:
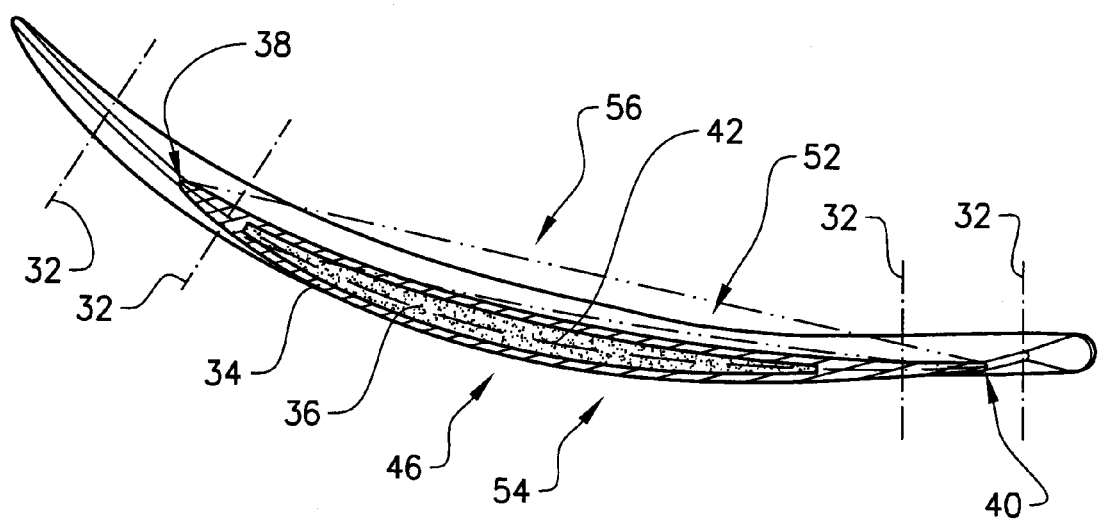
FIG. 4 illustrates a side view of a cross-section of the FIG. 2 guide vane.

FIG. 4 illustrates a cross-section of the FIG. 3 embodiment of the guide vane 22 as seen along lines IV-IV in FIG. 3. As may be gleaned from FIG. 4, the guide vane 22 is a composite guide vane comprising a cover portion 34 and a core portion 36 which is at least partially enclosed by the cover portion 34. The cover portion 34 comprises a first material and the core portion 36 comprises a second material which is different from the first material.

Purely by way of example, the first material may be a composite material such as a carbon fibre reinforced polymer. Moreover, and again purely by way of example, the second material may be a light weight structural core material such as a foam material or a honeycomb material.

The embodiment of the guide vane 22 illustrated in FIG. 3 and FIG. 4 also comprises a leading edge 38 and a trailing edge 40 and the guide vane 22 extends from the leading edge 38 to the trailing edge 40 along a mean camber line 42. When fluid is forced rearwardly through the gas turbine structure of which the guide vane 22 forms a part, the leading edge 38 is located upstream of the trailing edge 40.

The mean camber line 42 is defined as the locus of points halfway between a pressure side 52 and a suction side 54 of the guide vane 22 as measured perpendicular to the mean camber line 42 itself, see FIG. 4. The camber is identified as the maximum distance between the mean camber line 42 and a cord line 56. The cord line 56 is a straight line extending from the leading edge 38 and a trailing edge 40, wherein the maximum distance is measured in a direction perpendicular to the cord line 56, see FIG. 4. Moreover, the guide vane 22 comprises a chord length being the distance from the leading edge 38 to the trailing edge 40 along the mean camber line 42.

FIG. 3 further illustrates that the guide vane 22 comprises a first chord length at a first position in the guide vane direction and a second chord length l2 at a second position in the guide vane direction. Further, the second position is located at a first distance h, from the first opening 32 in the guide vane direction DGV. Thus, the first distance h t when measured in the guide vane direction DGv, is the distance from the mean camber line of the second position to the first opening 32. The first position, i.e. the camber line of the first position, is located at the first opening 32 or between the first opening and the second position in the guide vane direction DG .

In embodiments of the guide vane 22, such as the embodiment illustrated in FIG. 3, comprising a first attachment portion 30 which in turn comprises a plurality of openings 32, the first opening is the opening that is adapted to be located furthest away from the first housing 28 in the guide vane direction DGV. Consequently, if a first attachment portion 30 comprises a plurality of openings 32, the first chord length ^ is measured at or above, i.e. closer to the second position in the guide vane direction DGV, the location of the opening which is adapted to be located closest to the second housing 20.

The first distance hi is less than or equal to 0.15 of the guide vane length LGV. However, in embodiments of the present invention, the first distance may be less than or equal to 0.10 of the guide vane length LGV. A ratio between the first chord length \, and the second chord length l2 is greater than or equal to 1.10, preferably greater than or equal to 1.15. In embodiments of the guide vane 22, the ratio between the first chord length ^ and the second chord length l2 may be greater than or equal to 1.20. As such, as is indicated in e.g. the FIG. 3 embodiment of the guide vane 22, the guide vane 22 tapers from the first position to the second position. The tapering may be continuous or stepwise, but in many embodiments of the guide vane 22, a continuous tapering is preferred.

Moreover, in the FIG. 3 embodiment of the guide vane 22, the mean camber line of the first position extends through the opening of the first openings 32 which is located closest to the second housing 20.

Figure 6:
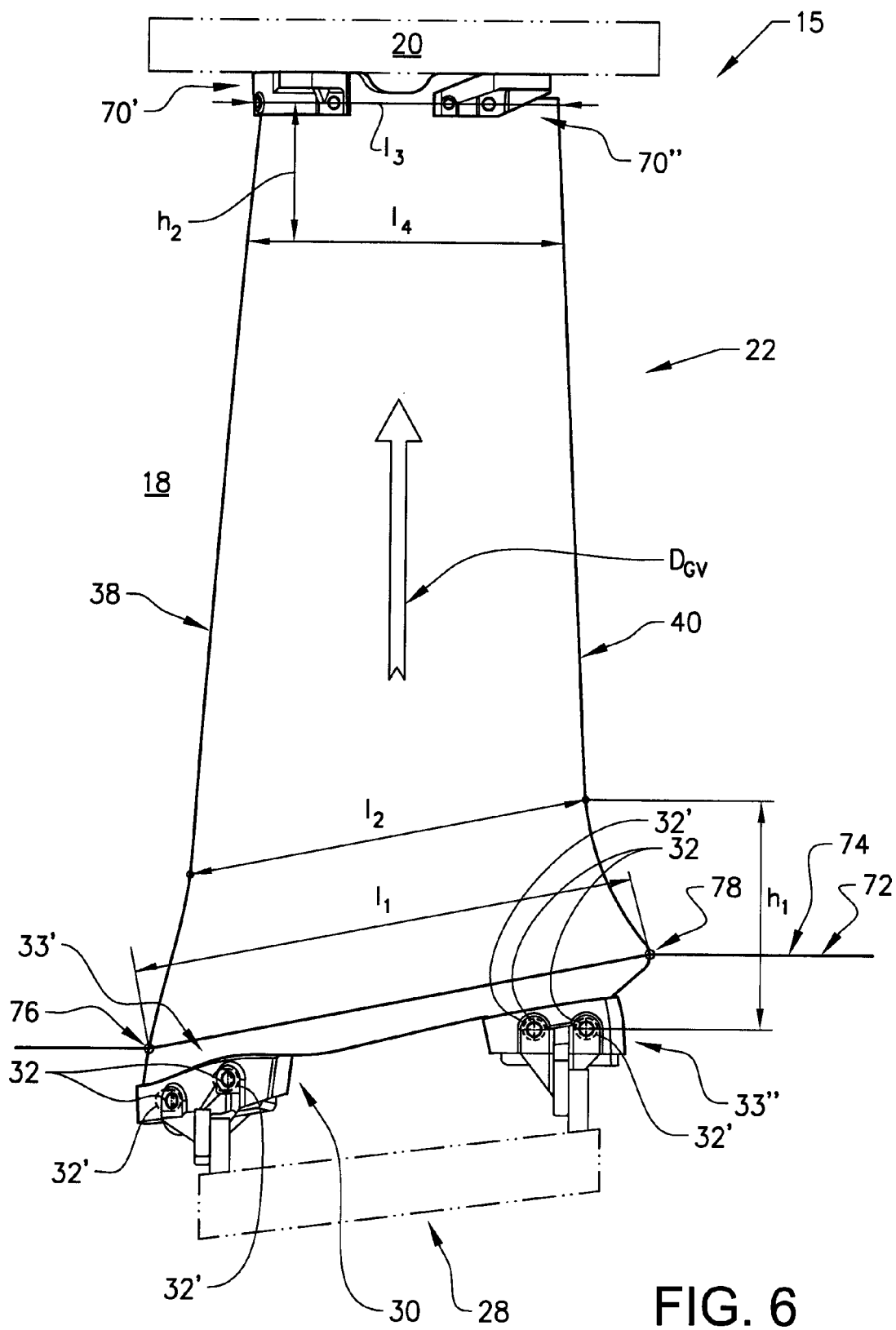
FIG. 6 illustrates a side view of a cross-section of a further embodiment of a guide vane according to the present invention.

However, in other embodiments of the present invention, the first position may be located further above each one of the first openings 32 such that the chord length of the guide vane 22 at a position of any one of the openings is smaller than the first chord length. An example of such an embodiment is illustrated in FIG. 6.

When determining the first chord length I•, and the second chord length l2, and in particular the ratio between the first chord length and the second chord length l2, i.e. l2, the first chord length as well as the second chord length l2 is measured along a mean camber line 42. When determining the ratio between the first chord length h and the second chord length l2, the chord length may be measured along a mean camber line 42 which is parallel to a mean camber line which extends from a leading edge camber point 41 to a trailing edge camber point 43 of the guide vane 22, see e.g. FIG. 5. Each one of the leading edge camber point 41 and the trailing edge camber point 43 is located closer to the first guide vane centre point 35 than the second guide vane centre point 37 in the guide vane direction DGv The leading edge camber point 41 is defined as the point on the leading edge 38 which is located above, i.e. located closer to the second guide vane centre point 37 in the guide vane direction DGv than, the centre of the foremost opening 32, i.e. the opening being located closest to the leading edge 38, of the attachment portion 30 and which has a largest distance from the guide vane centre line 39, when measured in a direction perpendicular to the guide vane direction DGV.

In a similar vein, the trailing edge camber point 43 is defined as the point on the trailing edge 40 which is located above, i.e. located closer to the second guide vane centre point 37 in the guide vane direction DGv than, the centre of the rearmost opening 32, i.e. the opening being located closest to the trailing edge 40, of the attachment portion 30 and which has a largest distance from the guide vane centre line 39, when measured in a direction perpendicular to the guide vane direction DGV.

FIG. 3 and FIG. 4 also illustrate that at least one of the first openings 32 extends in a first opening direction which forms an angle with the guide vane direction DGV. In fact, in the implementation of the first openings 32 illustrated in FIG. 3 and FIG. 4, each one of the first openings 32 extends in a direction which forms an angle with the guide vane direction DGV. Preferably, and as is illustrated in FIG. 3 and FIG. 4, each one of the first openings 32 extends in a direction which is substantially perpendicular to the guide vane direction DGV. Additionally, each one of the first openings 32 may preferably extend in a direction which is substantially perpendicular to the mean camber line 42, see FIG. 4.

FIG. 3 also illustrates that each one of the first openings 32 is located at a distance from the leading edge 38 along the mean camber line 42 of at least 5%, preferably at least 10%, of the first chord length. In a similar vein, FIG. 3 also illustrates that each one of the first openings 32 is located at a distance d2 from the trailing edge 40 along the mean camber line 42 of at least 5%, preferably at least 10%, of the first chord length.

The tapering of the guide vane 22 from the first position to the second position may be implemented in a plurality of ways. Purely by way of example, the tapering of the guide vane 22 may be implemented as a tapering of a portion of the vane 22 located at the leading edge 38 of the vane 22 or as a tapering of a portion of the vane 22 located at the trailing edge 40 of the vane 22. Moreover, in embodiments of the guide vane 22 of the present invention, the tapering may be implemented as a tapering of a portion of the vane 22 located at the leading edge 38 of the vane 22 as well as a tapering of a portion of the vane 22 located at the trailing edge 40.

Figure 5:
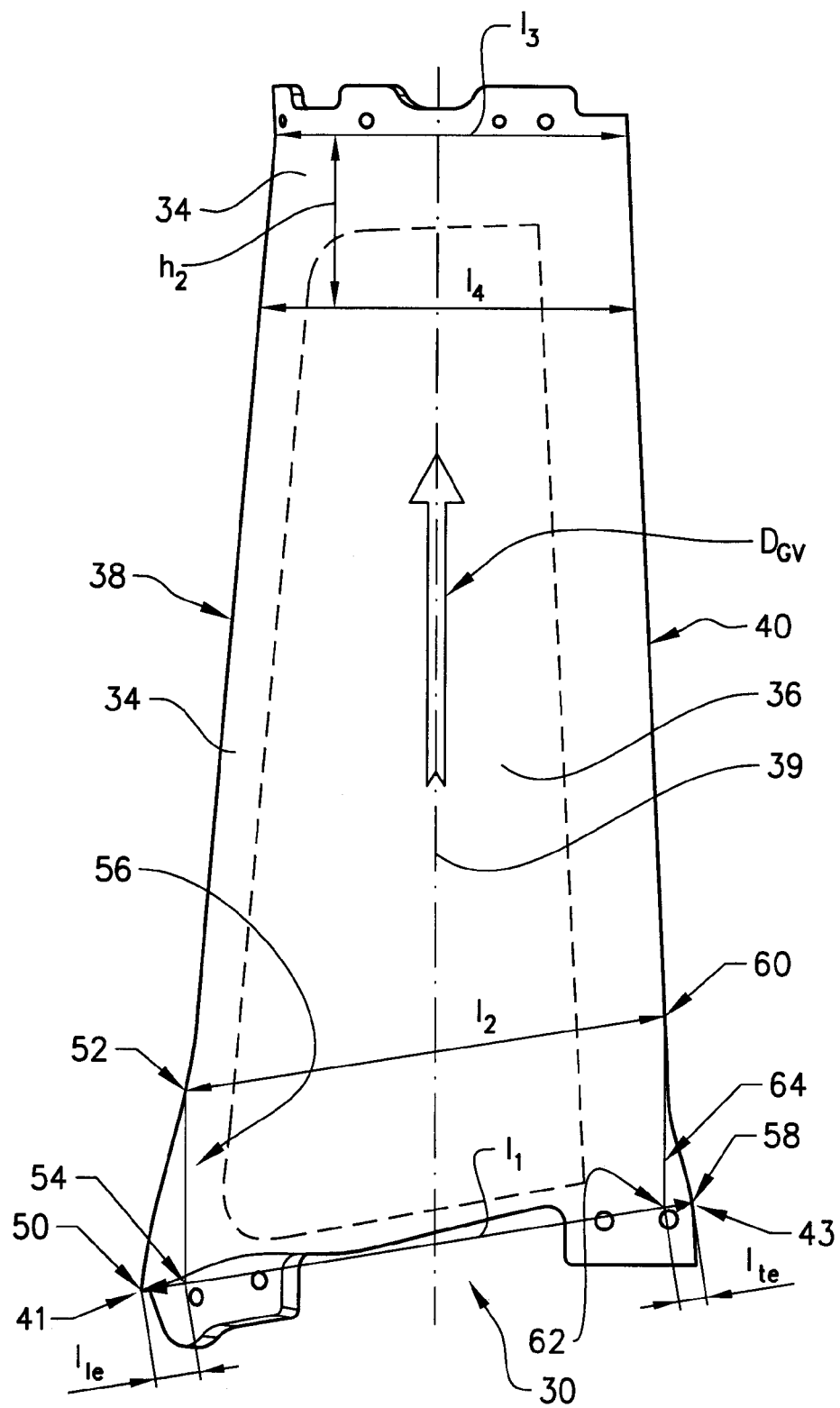
FIG. 5 illustrates a side view of a cross-section of another embodiment of a guide vane according to the present invention.

FIG. 5 illustrates an embodiment of the guide vane wherein the tapering is achieved for both the leading edge 38 and the trailing edge 40. As such, FIG. 5 illustrates that the guide vane 22 comprises a first leading edge point 50 on the mean camber line of the first position and a second leading edge point 52 on the mean camber line of the second position. Moreover, the guide vane 22 comprises a first intermediate point 54 located at a position on the mean camber line of the first position such that a first line 56 between the first intermediate point 54 and the second leading edge point 52 will extend in a direction which is parallel to the guide vane direction DGv.

Furthermore, the guide vane 22 comprises a leading edge distance lie being the distance from the first intermediate point 54 to the first leading edge point 50 along the mean camber line. The leading edge distance is preferably at least 10%, preferably at least 15%, of the second chord length l2. However, in other embodiments of the guide vane 22, the leading edge distance $l_{,e}$ may be zero which implies that a line (not shown) from the first leading edge point 50 to the second leading edge point 52 would extend in a direction which is substantially parallel to the guide vane direction DGV.

In a similar vein as for the trailing edge 40, FIG. 5 illustrates that the guide vane 22 comprises a first trailing edge point 58 on the mean camber line of the first position and a second trailing edge point 60 on the mean camber line of the second position. Moreover, the guide vane 22 comprises a second intermediate point 62 located at a position on the mean camber line of the first position such that a second line 64 between the second intermediate point 62 and the second trailing edge point 60 will extend in a direction which is parallel to the guide vane direction DGv.

Furthermore, the guide vane 22 comprises a trailing edge distance $l_{,e}$ being the distance from the second intermediate point 62 to the first trailing edge point 58 along the mean camber line. The trailing edge distance is preferably at least 10%, preferably at least 15%, of the second chord length l2. However, in other embodiments of the guide vane 22, the trailing edge distance may be zero which implies that a line (not shown) from the first trailing edge point 58 to the second trailing edge point 60 would extend in a direction which is substantially parallel to the guide vane direction DGv.

Furthermore, as may be gleaned from FIG. 5, the forwardmost opening, i.e. the opening which is located closest to the leading edge 38 along the mean camber line 42, of the first attachment area 30 is preferably located in a position along the mean camber line which is at least close to the first line 56. Purely by way of example, the distance between the forwardmost opening and the first line 56 along the mean camber line 42 may be less than 3%, preferably less than 1%, of the first chord length 1r In a similar vein, and as is also illustrated in FIG. 5, the rearmost opening, i.e. the opening which is located closest to the trailing edge 40 along the mean camber line 42, of the first attachment area 30 is preferably located in a position along the mean camber line which is at least close to the second line 64. Purely by way of example, the distance between the rearmost opening and the second line 64 along the mean camber line 42 may be approximately less than 3%, preferably less than 1%, of the first chord length 1r Moreover, FIG. 5 illustrates a cross-section of the FIG. 3 embodiment of the guide vane 22. In FIG. 5, the core portion 36 has an extension which terminates before at least one of the openings 32. In the FIG. 5 implementation of the first attachment portion 30, each one of the four openings 32 extends through the cover portion 34 but not through the core portion 36.

However, in other implementations of the present invention, the core portion 36 may extend over at least one opening 32. Purely be way of example, the core portion 36 may extend over least one opening 32, of a plurality of openings, wherein the at least one opening 32 is not the outermost opening, i.e. the at least one opening is not the opening of the plurality of openings which is located closest to the lead edge 38 or the trailing edge 40 as measured along the mean camber line 42.

FIG. 3 illustrates that the guide vane 22 further comprises a second attachment portion 66 comprising at least one second opening 68 for attachment of the guide vane 22 to the second housing 20 of the gas turbine structure. The implementation of the second attachment portion illustrated in FIG. 3 comprises four openings 68 such that the second attachment portion 66 may be attached to the second housing 20 by means of two attachment structures 70', 70". Moreover, FIG. 5 illustrates that the chord length of the guide vane 22 decreases smoothly towards the second housing 20.

However, in other embodiments of the present invention, guide vane 22 may have a tapered portion towards the second housing 20. As such, the guide vane 22 may comprise a third chord length l3 at a third position in the guide vane direction and a fourth chord length l4 at a fourth position in the guide vane direction DGv—Furthermore, the fourth position may be located at a second distance h2 from the second opening 68 in a direction opposite to the guide vane direction DGv and the third position may be located at the second opening 68 or between the second opening 68 and the fourth position. The second distance may be less than or equal to 0.15 of the guide vane length. Furthermore, the ratio between the third chord length l3 and the fourth chord length l4 may be greater than or equal to 1.10, preferably greater than or equal to 1.15 (not shown in FIG. 5). In embodiments of the guide vane 22, the ratio may greater than or equal to 1.20.

When determining the third chord length l3 and the fourth chord length 1, a mean camber line is preferably used which extends between an upper leading edge camber point (not shown) and an upper trailing edge camber point (not shown) which is defined in relation to the second openings 68 for the upper attachment structures 70', 70", i.e. the attachment structures which are adapted to attach the guide vane 22 to the second housing 20.

In contrast to the edge camber points for the first attachment portion 30 as described hereinabove, the upper edge camber points are located closer to the second guide vane centre point 37 than the first guide vane centre point 35 in the guide vane direction DGv However in a similar vein as for the edge camber points for the first attachment portion, the upper leading edge camber point is defined as the point on the leading edge 38 which is located below, i.e. located closer to the first guide vane centre point 35 in the guide vane direction DGv than, the centre of the foremost opening of the second openings 68, i.e. the opening being located closest to the leading edge 38, and which point has a largest distance from the guide vane centre line 39, when measured in a direction perpendicular to the guide vane direction DGV.

Further, the upper trailing edge camber point is defined as the point on the trailing edge 40 which located below, i.e. located closer to the first guide vane centre point 35 in the guide vane direction DGv than, the centre of the rearmost opening of the second openings 68, i.e. the opening being located closest to the trailing edge 40, and which point has a largest distance from the guide vane centre line 39, when measured in a direction perpendicular to the guide vane direction DGV.

FIG. 6 illustrates a further embodiment of the guide vane 22. The gas turbine structure illustrated in FIG. 6 comprises a guide vane 22, a first housing 28 and a second housing 20. Between the first housing 28 and the second housing 20, the gas turbine structure comprises a flow passage 8 through which air or any other fluid may flow when the gas turbine, of which the gas turbine structure may form a part, is in use.

FIG. 6 further illustrates that the gas turbine structure 15 comprises a flow passage delimiting member 72, or a flow passage delimiter, which is positioned such that the first attachment portion 30 is separated from said flow passage 18. In other words, the attachment portion 30 will be located in a portion of the gas turbine structure 15 which will have a low, and sometimes even zero, fluid flow when the gas turbine is in use.

The flow passage delimiting member 72 comprises a flowpath surface 74 facing the second housing and the flowpath surface 74 thus delimits the said flow passage 18.

Moreover, FIG. 6 illustrates that the guide vane 22 comprises a leading edge flow passage point 76 which is the point on the leading edge 38 which is located closest to the flow passage delimiting member 72 in the guide vane direction DGV. Moreover, the guide vane 22 comprising a trailing edge flow passage point 78 being the point on the trailing edge 40 which is located closest to the flow passage delimiting member 72 in the guide vane direction DGv.

In embodiments of a gas turbine structure 15 which comprises flow passage delimiting member 72, the mean camber line 42 as used herein may preferably be regarded as extending in a direction which is substantially parallel to a direction which extends from the leading edge flow passage point 76 to the trailing edge flow passage point 78.

Moreover, FIG. 6 illustrates that the first position of the guide vane, i.e. the position of the guide vane with the first chord length \, is located above each one of the openings 32 of the first attachment portion 30. As such, the guide vane 22 may be regarded as comprising a cut-out portion at the location of the rearmost opening, i.e. the opening which is located closest to the trailing edge 40. The rearmost opening is located below, i.e. closer to the first housing 28 than, the flow passage delimiting member 72, and there is generally not important to have a trailing edge with a small radius at the rearmost opening since it is generally not important to have a trailing edge with good aerodynamic properties in such a location.

It is to be understood that the present invention is not limited to the embodiments described above and illustrated in the drawings; rather, the skilled person will recognize that many changes and modifications may be made within the scope of the appended claims.

The invention claimed is:

1. A composite guide vane for a gas turbine structure, the guide vane being adapted to extend in a guide vane direction from a first housing towards a second housing of the gas turbine structure, the guide vane comprising a guide vane length in the guide vane direction the guide vane comprising a first attachment portion with at least one first opening for attachment of the guide vane to the first housing, the first opening extending in a first opening direction which forms an angle with the guide vane direction, the guide vane comprising a cover portion comprising a first material and a core portion which is at least partially enclosed by the cover portion, the core portion comprising a second material which is different from the first material, the guide vane comprising a leading edge and a trailing edge, the guide vane extending form the leading edge to the trailing edge along a mean camber line, the guide vane comprising a chord length being the distance from the leading edge to the trailing edge along the mean camber line, the guide vane comprising a first chord length at a first position in the guide vane direction and a second chord length at a second position in the guide vane direction, the second position being located at a first distance from the first opening in the guide vane direction and the first position being located at the first opening or between the first opening and the second position in the guide vane direction, the first distance being less than or equal to 0.15 of the guide vane length, wherein a ratio between the first chord length and the second chord length is greater than or equal to 1.10, wherein the guide vane further comprises a second attachment portion comprising at least one second opening for attachment of the guide vane to the second housing, the guide vane comprising a third chord length at a third position in the guide vane direction and a fourth chord length at a fourth position in the guide vane direction, the fourth position being located at a second distance from the second opening and the third position being located at the second opening or between the second opening and the fourth position in a direction opposite to the guide vane direction, further wherein the chord length of the guide vane is wider at the first opening than at the second opening.

2. The composite guide vane according to claim 1, wherein the guide vane comprises a first leading edge point on the mean camber line of the first position and a second leading edge point on the mean camber line of the second position, the guide vane further comprising a first intermediate point located at a position on the mean camber line of the first position such that a first line between the first intermediate point and the second leading edge point will extend in a direction which is parallel to the guide vane direction, the guide bane comprising a leading edge distance being the distance from the first intermediate point to the first leading edge point along the mean camber line, the leading edge distance being at least 10% of the second chord length.

3. The composite guide vane according to claim 1, wherein the guide vane comprises a first trailing edge point on the mean camber line of the first position and a second trailing edge point on the mean camber line of the second position, the guide vane further comprising a second intermediate point located at a position the mean camber line of the first position such that a second line between the second intermediate point and the second trailing edge point will extend in a direction which is parallel to the guide vane direction, the guide vane comprising a trailing edge distance being the distance from the second intermediate point to the first trailing edge point along the mean camber line, the trailing edge distance being at least 10% of the second chord length.

4. The composite guide vane according to claim 1, wherein the core portion has an extension which terminates before the first opening.

5. The composite guide vane according to claim 1, wherein the first opening is located a first opening distance from the leading edge along the mean camber line, the first opening distance being at least 5% of the first chord length.

6. The composite guide vane according to claim 5, wherein the first attachment portion comprises a plurality of openings, each one of the openings being located at a distance from the leading edge along the mean camber line of at least 5% of the first chord length.

7. The composite guide vane according to claim 1, wherein the first attachment portion comprises a plurality of openings, each one of the openings being located at a distance from the trailing edge along the mean camber line of at least 5% of the first chord length.

8. The composite guide vane according to claim 1, wherein the second distance being less than or equal to 0.15 of the guide vane length, wherein a ratio between the third chord length and the fourth chord length is greater than or equal to 1.10.

9. The composite guide vane according to claim 1, wherein the first material is a fibre material.

10. The composite guide vane according to claim 1, wherein the second material is a foam material.

11. The gas turbine structure, comprising the first housing, the second housing and the guide vane according to claim 1.

12. The gas turbine structure according to claim 11, wherein the gas turbine structure further comprises a flow passage between the first housing and the second housing, the gas turbine structure further comprising a flow passage delimiting member which is positioned such that the first attachment portion is separated from the flow passage.

13. A gas turbine engine comprising the gas turbine structure according to claim 11.

14. An aeroplane comprising the gas turbine engine according to claim 13.

* * * * *

UNITED STATES PATENT AND TRADEMARK OFFICE
CERTIFICATE OF CORRECTION

PATENT NO. : 9,670,789 B2
APPLICATION NO. : 14/005144
DATED : June 6, 2017
INVENTOR(S) : Niklas Jansson and Robert Reimers It is certified that error appears in the above-identified patent and that said Letters Patent is hereby corrected as shown below:

In the Claims

Column 12, in Line 61, replace "the guide bane comprising" with -- the guide vane comprising --.

Column 13, in Line 4, replace "at a position the mean camber" with -- at a position on the mean camber --.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*